United States Patent
Lin

(10) Patent No.: US 11,570,763 B2
(45) Date of Patent: Jan. 31, 2023

(54) UPLINK CONTROL INFORMATION TRANSMISSION METHOD AND DEVICE

(71) Applicant: GUANGDONG OPPO MOBILE TELECOMMUNICATIONS CORP., LTD., Guangdong (CN)

(72) Inventor: Yanan Lin, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/037,509

(22) Filed: Sep. 29, 2020

(65) Prior Publication Data

US 2021/0014857 A1   Jan. 14, 2021

Related U.S. Application Data

(63) Continuation of application No. PCT/CN2018/081400, filed on Mar. 30, 2018.

(51) Int. Cl.
*H04W 72/04* (2009.01)
*H04B 7/0456* (2017.01)
(Continued)

(52) U.S. Cl.
CPC ...... *H04W 72/0413* (2013.01); *H04B 7/0456* (2013.01); *H04B 7/0626* (2013.01);
(Continued)

(58) Field of Classification Search
None
See application file for complete search history.

(56) References Cited

U.S. PATENT DOCUMENTS

2013/0077541 A1   3/2013   Lin et al.
2014/0219201 A1   8/2014   Xu et al.
(Continued)

FOREIGN PATENT DOCUMENTS

CN   103227699 A   7/2013
CN   104348585 A   2/2015
(Continued)

OTHER PUBLICATIONS

Samsung: "Multiplexing of UL Transmissions with Different Reliability Requirements", 3GPP Draft; R1-1802002-Multiplexing of UL Transmissions With Different Reliability Requirements, 3rd Generation Partnership Project (3GPP), Mobile Competence Centre; 650, Route Des Lucioles; F-069 vol. RAN WG1, No. Athens, Greece; 20180226-2018030216 Feb. 2018 (Feb. 16, 2018), XP051397111, [retrieved on Feb. 16, 2018] * section 5 *.
(Continued)

*Primary Examiner* — Willie J Daniel, Jr.
(74) *Attorney, Agent, or Firm* — Perkins Coie LLP

(57) ABSTRACT

Provided are an uplink control information transmission method and device. The method is applied to a terminal and includes: determining that there is overlap in time domain between at least two types of UCIs of at least two types to be transmitted, where each type in the at least two types is independently configured with uplink transmission related information; and independently transmitting UCI of the each type in the at least two types according to the configured uplink transmission related information. The method is applied to a network device and includes: sending uplink transmission related information for at least two types of UCIs; determining that there is overlap in time domain between at least two types of UCIs of at least two types to be transmitted; and receiving UCI of the each type in the at
(Continued)

least two types according to the uplink transmission related information.

20 Claims, 3 Drawing Sheets

(51) Int. Cl.
 H04B 7/06 (2006.01)
 H04W 72/12 (2009.01)
(52) U.S. Cl.
 CPC ... H04W 72/0446 (2013.01); H04W 72/0493 (2013.01); H04W 72/1263 (2013.01)

(56) References Cited

U.S. PATENT DOCUMENTS

| | | | |
|---|---|---|---|
| 2016/0094996 A1 | 3/2016 | Xiong | |
| 2021/0282169 A1* | 9/2021 | Zhang | ............ H04L 1/1671 |

FOREIGN PATENT DOCUMENTS

| | | |
|---|---|---|
| CN | 106664520 A | 5/2017 |
| CN | 107426819 A | 12/2017 |
| CN | 107734680 A | 2/2018 |
| EP | 3500008 A1 | 6/2019 |
| WO | 2018031638 A1 | 2/2018 |

OTHER PUBLICATIONS

Supplementary European Search Report in the European application No. 18912066.0, dated Feb. 9, 2021.
Written Opinion of the International Search Authority in the international application No. PCT/CN2018/081400, dated Jan. 7, 2019.
International Search Report in the international application No. PCT/CN2018/081400, dated Jan. 7, 2019.
First Office Action of the Japanese application No. 2020-552873, dated Feb. 18, 2022. 11 pages with English translation.
First Office Action of the Taiwanese application No. 108111324, dated Mar. 22, 2022. 11 pages with English translation.
NTT Docomo, Inc., "DL/UL scheduling and HARQ management"[online], 3GPP TSG RAN WG1 #90b R1-1718217, Internet<URL:http://www.3gpp.org/ftp/tsg_ran/WG1_RL1/TSGR1_90b/Docs/R1-1718217.zip>, Oct. 13, 2017. 16 pages.
NTT Docomo, Inc., "HARQ-ACK feedback"[online], 3GPP TSG RAN WG1 adhoc_NR_AH_1709 R1-1716105, Internet<URL:http://www.3gpp.org/ftp/tsg_ran/WG1_RL1/TSGR1_AH/NR_AH_1709/Docs/R1-1716105.zip>, Sep. 21, 2017. 13 pages.
Qualcomm Incorporated, "Remaining issues for resource allocation for PUCCH"[online], 3GPP TSG RAN WG1 #92 R1-1802840, Internet<URL:http://www.3gpp.org/ftp/tsg_ran/WG1_RL1/TSGR1_92/Docs/R1-1802840.zip>, Mar. 2, 2018. 11 pages.
First Office Action of the Chinese application No. 202110857221.0, dated Sep. 21, 2022. 11 pages with English translation.

* cited by examiner

US 11,570,763 B2

UPLINK CONTROL INFORMATION TRANSMISSION METHOD AND DEVICE

CROSS REFERENCE TO RELATED APPLICATION

This application is a continuation of International Patent Application No. PCT/CN2018/081400 filed on Mar. 30, 2018, the disclosure of which is hereby incorporated by reference in its entirety.

BACKGROUND

In a New Radio (NR) system, for example, a 5th-Generation (5G) application, there are three major service scenarios: an Enhance Mobile Broadband (eMBB) service, an Ultra Reliable and Low Latency Communication (URLLC) service and massive Machine Type of Communication (mMTC). A terminal may transmit data of these services on a configured transmission resource according to a service requirement.

Because the three major services have relatively great differences in latency and reliability requirements, for meeting transmission requirements of low latency and ultrahigh reliability for the URLLC service, data transmission for the URLLC service has been partially enhanced and optimized at present.

However, at present, enhancement and optimization of UCI for the URLLC service is also limited and the transmission requirements low latency and ultrahigh reliability for the URLLC service may not be satisfied. Therefore, there is an urgent need to provide a UCI control method for improving the UCI transmission reliability of the URLLC service and reducing the UCI transmission latency of the URLLC service, so as to improve the system transmission efficiency.

SUMMARY

Embodiments of the disclosure relate to communication technologies, and particularly to a method and device for Uplink Control Information (UCI) transmission.

Multiple aspects of the disclosure provide a UCI transmission method and device, to improve the system transmission efficiency.

A first aspect of the disclosure provides a UCI transmission method, which is applied to a terminal and includes the following operations. It is determined that there is overlap between at least two types of UCIs of at least two types to be transmitted, where each type in the at least two types is independently configured with uplink transmission related information. UCI of each type in the at least two types is independently transmitted according to the configured uplink transmission related information.

A second aspect of the disclosure provides a UCI transmission device, which includes a processor and a memory configured to store instructions executable by the processor. The processor executes the instructions to cause the device to: determine that there is overlap in time domain between at least two types of UCIs of at least two types to be transmitted, where each type of the at least two types is independently configured with uplink transmission related information; and independently transmit UCI of the each type in the at least two types according to the configured uplink transmission related information.

A thirst aspect of the disclosure provides a UCI transmission method, which is applied to a network device and includes the following operations. Uplink transmission related information for at least two types of UCIs of at least two types to be transmitted is sent, where each type in the at least two types is independently configured with uplink transmission related information. It is determined that there is overlap in time domain between the at least two types of UCIs of at least two types to be transmitted. UCI of the each type in the at least two types is received according to the configured uplink transmission related information.

A fourth aspect of the disclosure provides a UCI transmission device, which includes a processor and a memory configured to store instructions executable by the processor. The processor executes the instructions to cause the device to: send uplink transmission related information for at least two types of UCIs of at least two types to be transmitted, where each type in the at least two types is independently configured with uplink transmission related information; determine that there is overlap in time domain between the at least two types of UCIs of at least two types to be transmitted; and receive UCI of the each type in the at least two types according to the configured uplink transmission related information.

It can be seen from the technical solutions that, according to the embodiments of the disclosure, it is determined that there is overlap between the at least two types of UCIs of at least two types to be transmitted and then the UCI of each type in the at least two types may be independently transmitted, so that the system transmission efficiency is improved.

BRIEF DESCRIPTION OF THE DRAWINGS

In order to describe the technical solutions in the embodiments of the disclosure more clearly, the drawings required to be used in descriptions about the embodiments or the conventional art will be simply introduced below. It is apparent that the drawings described below are some embodiments of the disclosure. Other drawings may further be obtained by those of ordinary skill in the art according to these drawings without creative work.

DETAILED DESCRIPTION

In order to make the purpose, technical solutions and advantages of the embodiments of the disclosure clearer, the technical solutions in the embodiments of the disclosure will be clearly and completely described below in combination with the drawings in the embodiments of the disclosure. It is apparent that the described embodiments are not all embodiments but part of embodiments of the disclosure. All other embodiments obtained by those of ordinary skill in the art based on the embodiments in the disclosure without creative work shall fall within the scope of protection of the disclosure.

In the disclosure, term "and/or" is only an association relationship describing associated objects and represents that three relationships may exist. For example, A and/or B may represent three conditions: i.e., independent existence of A, existence of both A and B and independent existence of B. In addition, character "/" in the disclosure usually represents that previous and next associated objects form an "or" relationship.

Figure 1A:
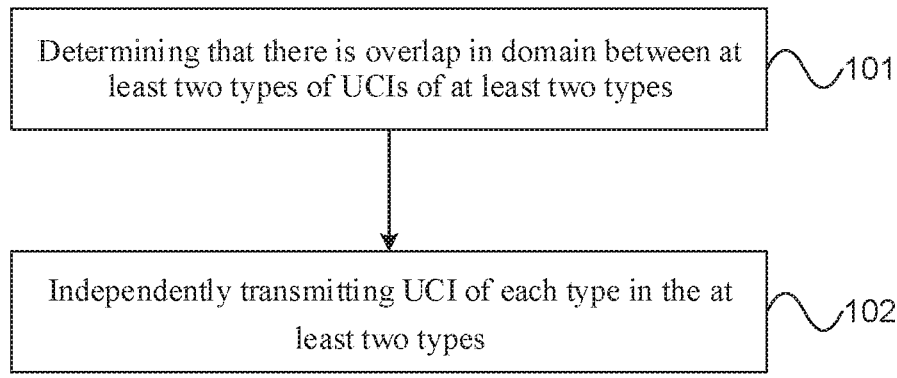
FIG. 1A is a flowchart of a UCI transmission method according to an embodiment of the disclosure.

FIG. 1A is a flowchart of a UCI transmission method according to an embodiment of the disclosure, as illustrated in FIG. 1A.

In 101, it is determined that there is overlap in time domain between at least two types of UCIs of at least two types to be transmitted.

The so-called type may refer to a service type that is divided according to a service, for example, an eMBB service, a URLLC service, and an mMTC service. The type may also refer to another type divided according to another criterion. There are no specific limits made thereto in the embodiment.

In 102, the UCI of each type in the at least two types is independently transmitted.

It is to be noted that an execution entity of the operations 101 and 102 may be a terminal and may also be a network device. There are no specific limits made thereto in the embodiment.

In the present disclosure, the transmitted UCI refers to UCI required to be transmitted between the terminal and the network device, and may be carried in a physical uplink channel. The physical uplink channel may include, but not limited to, at least one of a Physical Uplink Shared Channel (PUSCH) or a Physical Uplink Control Channel (PUCCH). There are no specific limits made thereto in the embodiment.

The UCI may include, but not limited to, at least one of the following information:
- feedback information of downlink data, namely Acknowledgement (ACK) information indicating that the downlink data is correctly received or Negative Acknowledgement (NACK) information indicating that the downlink data is not correctly received;
- Channel State Information (CSI); or
- a Scheduling Request (SR) for uplink data.

The technical solution provided in the disclosure may be applied to an NR system, for example, a 5G application. The NR system may have three major service scenarios: the eMBB service, URLLC service and mMTC. The terminal may transmit service data and control information of these services on a configured transmission resource according to a service requirement. Therefore, the type involved in the disclosure may include, but not limited to, at least two service types of an eMBB service type, a URLLC service type and an mMTC service type. There are no specific limits made thereto in the embodiment.

Optionally, in a possible implementation mode of the embodiment, before the operation 101, each type may further be independently configured with uplink transmission related information.

In a specific implementation process, the uplink transmission related information may include, but not limited to, at least one of the following information:
- a transmission resource;
- a feedback mode; or
- a feedback timing sequence parameter K1.

The transmission resource refers to a resource configured to transmit the physical uplink channel carrying the UCI of each type, and may include, but not limited to, at least one of a time-domain resource, a frequency-domain resource or a power-domain resource. There are no specific limits made thereto in the embodiment.

For example, for the URLLC service type and the eMBB service type, independent PUCCH transmission resources, i.e., PUCCH resources, may be configured for the URLLC service type and the eMBB service type.

Figure 1B:
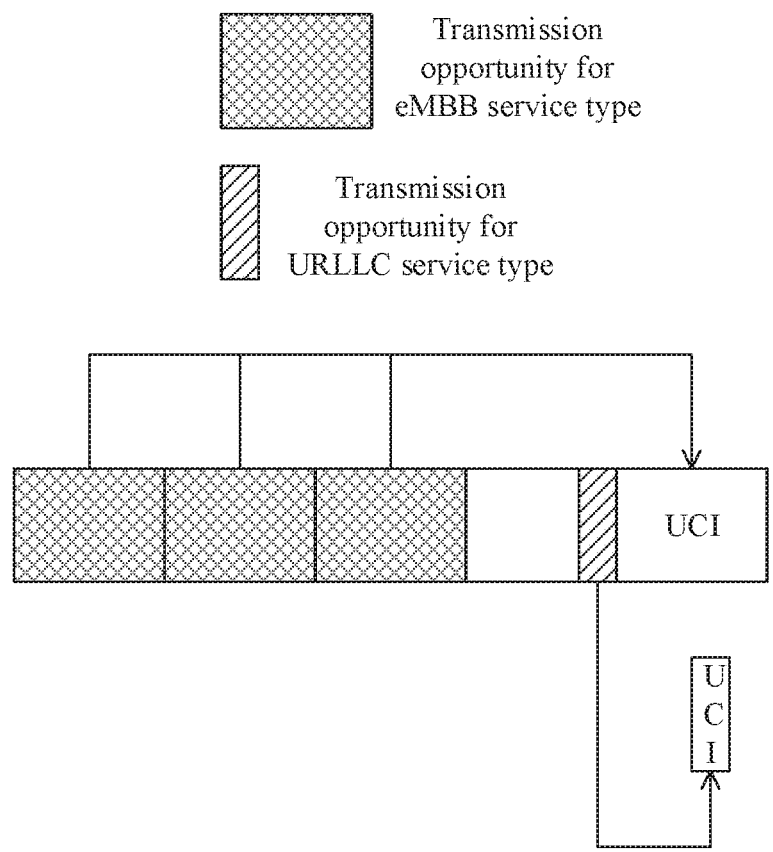
FIG. 1B is a schematic diagram of a transmission resource according to an embodiment corresponding to FIG. 1A.

For example, the URLLC service may be configured with a low-capacity short PUCCH resource, and the eMBB service type may be configured with a high-capacity long PUCCH resource, as shown in FIG. 1B.

For example, for the URLLC service type and the eMBB service type, independent PUSCH transmission resources, i.e., PUSCH resources, may be configured for the URLLC service type and the eMBB service type. When the UCI is required to be mapped to the PUSCH in a piggyback manner to be carried, a piggyback transmission may be adopted. A mapping parameter for the piggyback transmission may include, but not limited to, at least one of a piggyback mapping position or a piggyback mapping manner. There are no specific limits made thereto in the embodiment.

Figure 1C:
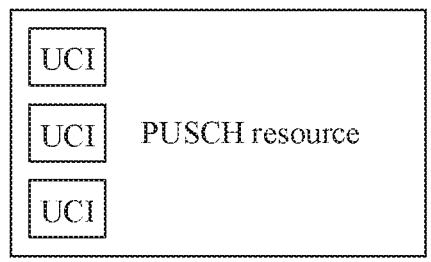
FIG. 1C is another schematic diagram of a transmission resource according to an embodiment corresponding to FIG. 1A.
Figure 1D:
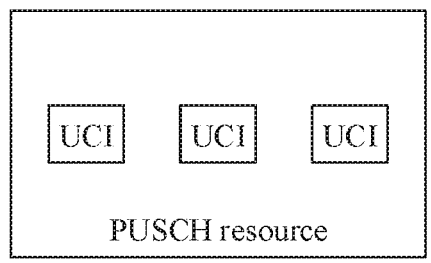
FIG. 1D is another schematic diagram of a transmission resource according to an embodiment corresponding to FIG. 1A.

For example, the URLLC service type and the eMBB service type may be configured with independent piggyback mapping positions. Specifically, the URLLC service type may be configured with a piggyback mapping position on a limited transmission resource such as a limited Code Block Group (CBG) or symbol, for example, a temporally earlier position, as shown in FIG. 1C. The eMBB service type may be configured with a piggyback mapping position on all transmission resources, for example, without any additional limit in time domain, or on a transmission resource close to a Demodulation Reference Signal (DMRS), etc. as shown in FIG. 1D.

For another example, the URLLC service type and the eMBB service type may be configured with independent piggyback mapping manners. Specifically, a piggyback mapping manner configured for the URLLC service type is a puncture manner, which is favorable for preparation of data in advance. Since the eMBB service type is relatively long in feedback latency and there is enough time for data preparation, a piggyback mapping manner configured for the eMBB service type may be a rate matching manner, which may effectively improve the reliability of the PUSCH.

The feedback mode refers to a feedback manner in a codebook window of each type, which may include, but not limited to, a dynamic codebook feedback manner and a semi-static codebook feedback manner. There are no specific limits made thereto in the embodiment.

For example, for the URLLC service type and the eMBB service type, independent feedback modes may be configured for the URLLC service type and the eMBB service type.

For example, the URLLC service type may be configured with the dynamic codebook feedback manner may be configured for, and the eMBB service type may be configured with the semi-static codebook feedback manner The feedback timing sequence parameter K1 is configured to determine a transmission opportunity in the codebook window of each type.

For example, for the URLLC service type and the eMBB service type, at least one of an independent parameter set, a value range and a unit of the feedback time sequence parameter K1 may be configured for each of the URLLC service type and the eMBB service type.

For example, a value range of K1, configured for the URLLC service type, may be relatively small, for example, within {0, 1}, and a value range of K1, configured for the eMBB service type, may be wide, for example, within {1, 2, 3, 4, 8, 16, 20, 31}. Or, for another example, a unit of K1, configured for the URLLC service type, may be in symbol, and a unit of K1, configured for the eMBB service type, may be in slot.

Figure 1E:
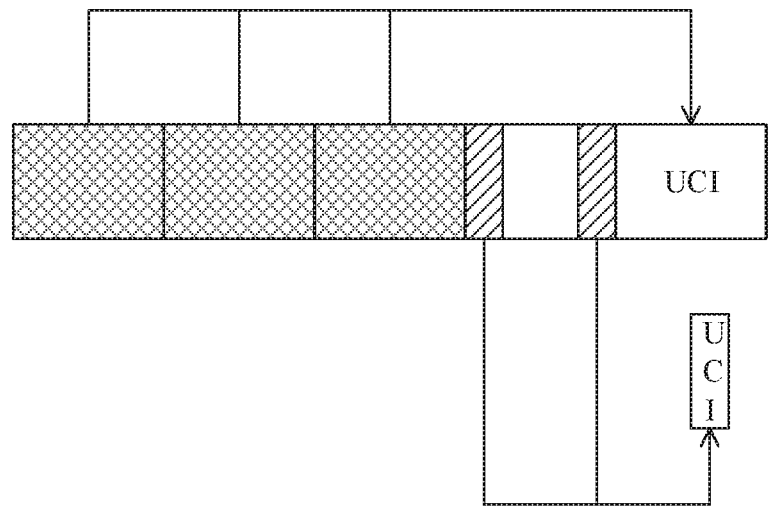
FIG. 1E is another schematic diagram of a transmission resource according to an embodiment corresponding to FIG. 1A.
Figure 1F:
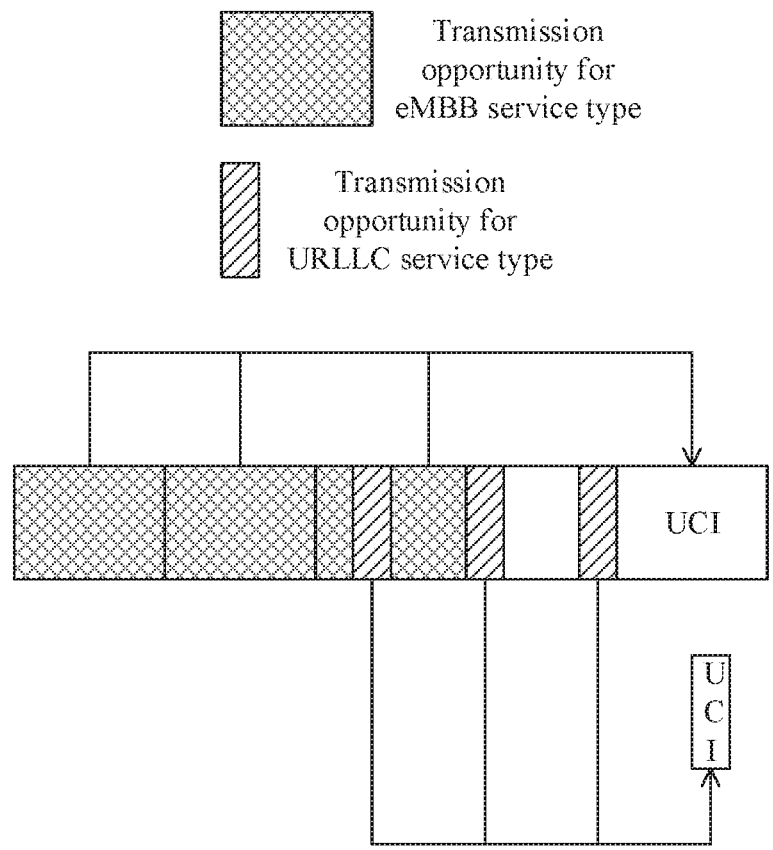
FIG. 1F is another schematic diagram of a transmission resource according to an embodiment corresponding to FIG. 1A.

Correspondingly, since the URLLC service type and the eMBB service type are configured independently with at least one of the value range or the unit of the feedback timing sequence parameter K1, codebook windows may be independently determined for the URLLC service type and the eMBB service type. If the eMBB service type is configured with K1_eMBB{2,3,4} and in the unit of slot and the URLLC service type is provided with K1_URLLC{1} and in the unit of slot, a transmission opportunity of an eMBB Physical Downlink Control Channel (PDCCH)/Semi-Persistent Scheduling (SPS) corresponding to the PUCCH in slot5 indicated by the eMBB service type may be slot1, slot2 and slot3, and a transmission opportunity of a URLLC PDCCH/SPS corresponding to the PUCCH in slot5 indicated by the URLLC service type may be slot4, as shown in FIG. 1E. Even though the codebook windows of the eMBB service type and the URLLC service overlap, independent counting, independent mapping and independent feedback are performed for them, as shown in FIG. 1F.

In another specific implementation process, the uplink transmission related information of each type may be configured by the network device.

Specifically, the terminal may specifically receive the uplink transmission related information of each type transmitted by the network device through Downlink Control Information (DCI), high-layer signaling or a system broadcast message.

For example, the high-layer signaling may be a Radio Resource Control (RRC) message, and specifically the uplink transmission related information of each type may be carried through an Information Element (IE) in the RRC message. The RRC message may be an RRC message in the conventional art, for example, an RRC connection reconfiguration message, and there are no limits made thereto in the embodiment. An IE of an existing RRC message is extended to carry the uplink transmission related information of each type. Or the RRC message may also be different from the existing RRC message in the conventional art.

Or, for another example, the high-layer signaling may be a Media Access Control (MAC) Control Element (CE) message, and specifically a new MAC CE message may also be added to carry the uplink transmission related information of each type.

Or, for another example, specifically the uplink transmission related information of each type may be carried by an existing Master Information Block (MIB) or System Information Block (SIB) in the system broadcast message, and a new SIB may also be added to carry the uplink transmission related information of each type.

It can be understood that the uplink transmission related information of each type may also be predetermined through a protocol.

A part of the uplink transmission related information of each type may be configured by the network device and the other part is predetermined through the protocol. There are no specific limits made thereto in the embodiment.

Optionally, in a possible implementation mode of the embodiment, in 101, the type of the UCI may specifically be determined according to a transmission parameter. The transmission parameter may include, but not limited to, at least one of the following parameters:

a service type indication;
a Transmission Time Interval (TTI) length, namely a TTI of the downlink data;
feedback timing, for example, feedback timing of the feedback information of the downlink data or feedback timing of the CSI;
a resource type indication, for example, TypeA or TypeB;
a transmission set;
a period, for example, a period of the SR or a period of the CSI; and
configuration information, for example, configuration information of the SR such as a configuration sequence number or priority of the SR, or, for another example, configuration information of the CSI such as a target Block Error Rate (BLER).

Optionally, in a possible implementation mode of the embodiment, in 102, the transmission resource corresponding to the codebook window of each type, for example, a transmission resource for the feedback information of the downlink data, may specifically be determined according to a last transmission opportunity of the type in the codebook window of each type.

The last transmission opportunity may indicates a last transmission opportunity in a dynamic scheduling, or may also be a last transmission opportunity in any scheduling manner, for example, the last transmission opportunity in the dynamic scheduling or a last transmission opportunity in a non-dynamic scheduling. There are no specific limits made thereto in the embodiment.

Optionally, in a possible implementation mode of the embodiment, in 102, the transmission resource for each type, for example, a transmission resource for the CSI or a transmission resource for the SR for uplink data, may specifically be determined according to an uplink control resource configuration of each type.

Optionally, in a possible implementation mode of the embodiment, the UCI to be transmitted at least includes UCI of two types, namely UCI of a first type and UCI of a second type.

A service priority of the first type may be higher than or equal to a service priority of the second type, or may also be lower than the service priority of the second type. There are no specific limits made thereto in the embodiment.

In the NR system, for example, in the 5G application, a service priority of the URLLC service type is higher than a service priority of the eMBB service type, and the service priority of the eMBB service type is higher than a service priority of an mMTC service type.

In a specific implementation process, the operation 102 may specifically include that, the UCI of each type may be transmitted on the transmission resource corresponding to the codebook window of the type.

In the implementation process, if first transmission condition is satisfied for the terminal, the UCI of each type may be transmitted on the transmission resource corresponding to the codebook window of the type.

The first transmission condition may include, but not limited to, at least one of the following conditions:
power being not limited;
discontinuous transmission being supported; and
the terminal having a discontinuous transmission capability.

For example, for the URLLC service type and the eMBB service type, if the terminal meets the first transmission condition, the UCI of each type may be transmitted on transmission resources corresponding to their respective codebook windows.

In another specific implementation process, the operation 102 may specifically include that, the UCI of the first type and the UCI of the second type may be transmitted on a first transmission resource corresponding to a codebook window of the first type.

In the implementation process, if the terminal meets a second transmission condition, the UCI of the first type and the UCI of the second type may be transmitted on the first transmission resource corresponding to the codebook window of the first type.

The second transmission condition may include, but not limited to, at least one of the following conditions:
 the power is limited;
 discontinuous transmission is not supported; and
 the terminal does not have the discontinuous transmission capability.

For example, for the URLLC service type and the eMBB service type, if the terminal meets the second transmission condition and the first transmission resource corresponding to the codebook window of the URLLC service type is sufficient for transmission, UCI of the URLLC service type and UCI of the eMBB service type may be transmitted on the first transmission resource.

Specifically, the UCI of the URLLC service type and the UCI of the eMBB service type may adopt the same code, or may also adopt different codes, for example, adopting different code rates. There are no specific limits made thereto in the embodiment.

The UCI of the URLLC service type and the UCI of the eMBB service type, that are transmitted on the first transmission resource, may be sequenced in order of time, or the UCI of the URLLC service type may be preferably transmitted and then the UCI of the eMBB service type is transmitted. There are no specific limits made thereto in the embodiment.

If the first transmission resource corresponding to the codebook window of the URLLC service type is insufficient, complete transmission may be preferably adopted for the UCI of the URLLC service type on the first transmission resource, and partial transmission or all-bit hard transmission, namely adopting a code rate higher than reliable transmission, is adopted for the UCI of the eMBB service type on the first transmission resource. There are no specific limits made thereto in the embodiment.

In another specific implementation process, the operation 102 may specifically include that, the UCI of the first type may be transmitted on the first transmission resource corresponding to the codebook window of the first type.

In the implementation process, if the terminal meets the second transmission condition and the terminal may transmit the UCI of only one type, the UCI of the first type may be transmitted on the first transmission resource corresponding to the codebook window of the first type.

The second transmission condition may include, but not limited to, at least one of the following conditions:
 the power is limited;
 discontinuous transmission is not supported; and
 the terminal does not have the discontinuous transmission capability.

For example, for the URLLC service type and the eMBB service type, if the terminal meets the second transmission condition and the terminal may transmit the UCI of only one type, complete transmission may be preferably adopted for the UCI of the URLLC service type on the first transmission resource.

In the embodiment, it is determined that there is overlap in time domain between at least two types of UCIs of at least two types to be transmitted and then the UCI of each type in the at least two types may be independently transmitted, so that the system transmission efficiency is improved.

It is to be noted that, for simple description, each method embodiment is expressed into a combination of a series of actions. However, those skilled in the art should know that the disclosure is not limited by an action sequence described herein because some steps may be executed in another sequence or at the same time according to the disclosure. Second, those skilled in the art should also know that the embodiments described in the specification all belong to preferred embodiments and involved actions and modules are not always necessary to the disclosure.

Each embodiment in the abovementioned embodiments is described with different emphases, and undetailed parts in a certain embodiment may refer to related descriptions in the other embodiments.

Figure 2:
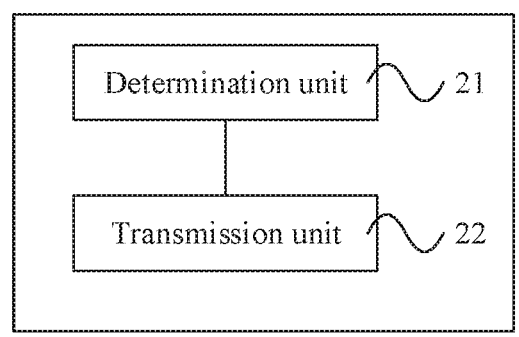
FIG. 2 is a structure diagram of a UCI transmission device according to another embodiment of the disclosure.

FIG. 2 is a structure diagram of a UCI transmission device according to another embodiment of the disclosure, as shown in FIG. 2. The UCI transmission device of the embodiment may include a determination unit 21 and a transmission unit 22. The determination unit 21 is configured to determine that at least two types of UCIs of at least two types to be transmitted overlap in time domain. The transmission unit 22 is configured to independently transmit the UCI of each type of the at least two types.

It is to be noted that the UCI transmission device provided in the embodiment may be a terminal or a network device. There are no specific limits made thereto in the embodiment.

In the present disclosure, the UCI to be transmitted refers to UCI required to be transmitted between the terminal and the network device, and may be carried in a physical uplink channel. The physical uplink channel may include, but not limited to, at least one of a PUSCH or a PUCCH. There are no specific limits made thereto in the embodiment.

The UCI may include, but not limited to, at least one of the following information:
 feedback information of downlink data, namely ACK information indicating that the downlink data is correctly received or NACK information indicating that the downlink data is not correctly received;
 CSI; or
 an SR for uplink data.

Optionally, in a possible implementation mode of the embodiment, the transmission unit 22 may further be configured to independently configure uplink transmission related information of each type.

In a specific implementation process, the uplink transmission related information may include, but not limited to, at least one of the following information:
 a transmission resource;
 a feedback mode; or
 a feedback timing K1.

Optionally, in a possible implementation mode of the embodiment, the determination unit 21 may specifically be configured to determine the type of the UCI according to a transmission parameter. The transmission parameter may include, but not limited to, at least one of the following parameters:
 a service type indication;
 a TTI length;
 feedback time;

a resource indication type;
a transmission set;
a period; or
configuration information.

Optionally, in a possible implementation mode of the embodiment, the transmission unit 22 may specifically be configured to determine the transmission resource corresponding to a codebook window of each type according to a last transmission opportunity of the type in the codebook window of each type or determine the transmission resource for each type according to an uplink control resource configuration of each type.

The last transmission opportunity may be a last transmission opportunity in dynamic scheduling, or may also be a last transmission opportunity in any scheduling manner, for example, the last transmission opportunity in the dynamic scheduling or a last transmission opportunity in non-dynamic scheduling. There are no specific limits made thereto in the embodiment.

Optionally, in a possible implementation mode of the embodiment, the UCI to be transmitted at least includes two types of UCI, namely UCI of a first type and UCI of a second type.

A service priority of the first type may be higher than or equal to a service priority of the second type.

Specifically, the transmission unit 22 may specifically be configured to transmit the UCI of each type on the transmission resource corresponding to the codebook window of the type, or transmit the UCI of the first type and the UCI of the second type on a first transmission resource corresponding to a codebook window of the first type, or transmit the UCI of the first type on the first transmission resource corresponding to the codebook window of the first type.

It is to be noted that the method in the embodiment corresponding to FIG. 1A to FIG. 1F may be implemented by the network device provided in the embodiment. Detailed descriptions may refer to related contents in the embodiment corresponding to FIG. 1A to FIG. 1F and elaborations are omitted herein.

In the embodiment, the determination unit determines that there is overlap in time domain between at least two types of UCIs of at least two types to be transmitted, and then the transmission unit may independently transmit the UCI of each type in the at least two types, so that the system transmission efficiency is improved.

Those skilled in the art may clearly learn about that specific working processes of the system, device and unit described above may refer to the corresponding processes in the method embodiment and will not be elaborated herein for convenient and brief description.

In some embodiments provided by the disclosure, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each function unit in each embodiment of the disclosure may be integrated into a processing unit, each unit may also exist independently, and two or more than two units may also be integrated into a unit. The integrated unit may be implemented in a hardware form and may also be implemented in form of hardware and software functional unit.

It is finally to be noted that: the above embodiments are adopted not to limit but only to describe the technical solutions of the disclosure; although the disclosure is described with reference to the embodiments in detail, those of ordinary skill in the art should know that modifications may also be made to the technical solutions recorded in each embodiment or equivalent replacements may be made to part of technical features therein; and these modifications or replacements do not make the essence of the corresponding technical solutions depart from the spirit and scope of the technical solutions of each embodiment of the disclosure.

The invention claimed is:

1. A method for uplink control information (UCI) transmission, performed by a terminal, the method comprising:
  determining that there is overlap in time domain between at least two types of UCIs of at least two types to be transmitted, wherein each type in the at least two types is independently configured with uplink transmission related information; and
  independently transmitting UCI of the each type in the at least two types according to the configured uplink transmission related information,
  wherein the UCI comprises feedback information of downlink data, and the configured uplink transmission related information comprises at least one of a feedback mode or a feedback timing sequence parameter K1.

2. The method of claim 1, wherein the UCI further comprises at least one of the following information:
  channel state information; or
  a scheduling request for uplink data.

3. The method of claim 1, wherein the uplink transmission related information further comprises:
  PUCCH resource.

4. The method of claim 1, further comprising:
  determining a type of the UCI according to a transmission parameter, the transmission parameter comprising at least one of the following parameters:
  a service type indication;
  a Transmission Time Interval (TTI) length;
  feedback time;
  a resource indication type;
  a transmission set;
  a period; or
  configuration information.

5. The method of claim 1, further comprising:
  determining a transmission resource corresponding to a codebook window of the each type according to a last transmission opportunity of the type in the codebook window of the each type; or
  determining a transmission resource for the each type according to an uplink control resource configuration of the each type.

6. The method of claim 1, wherein the at least two types comprise a first type and a second type, and independently transmitting the UCI of the each type in the at least two types comprises:
transmitting the UCI of each type on a transmission resource corresponding to a codebook window of the each type, or transmitting UCI of a first type and UCI of a second type on a first transmission resource corresponding to a codebook window of the first type, or transmitting the UCI of the first type on the first transmission resource corresponding to the codebook window of the first type.

7. The method of claim 1, wherein the feedback mode is a feedback manner in a codebook window of each type, and the feedback timing sequence parameter K1 is configured to determine a transmission opportunity in the codebook window of each type.

8. A device for uplink control information (UCI) transmission, comprising:
a processor; and
a memory configured to store instructions executable by the processor,
wherein the processor executes the instructions to cause the device to:
determine that there is overlap in time domain between at least two types of UCIs of at least two types to be transmitted, wherein each type of the at least two types is independently configured with uplink transmission related information; and
independently transmit UCI of the each type in the at least two types according to the configured uplink transmission related information,
wherein the UCI comprises feedback information of downlink data, and the configured uplink transmission related information comprises at least one of a feedback mode or a feedback timing sequence parameter K1.

9. The device of claim 8, wherein the UCI further comprises at least one of the following information:
channel state information; or
heduling request for uplink data.

10. The device of claim 8, wherein the uplink transmission related information further comprises:
PUCCH resource.

11. The device of claim 8, wherein the processor executes the instructions to cause the device to:
determine a type of the UCI according to a transmission parameter, the transmission parameter comprising at least one of the following parameters:
a service type indication;
a Transmission Time Interval (TTI) length;
feedback time;
a resource indication type;
a transmission set;
a period; or
configuration information.

12. The device of claim 8, wherein the processor executes the instructions to cause the device to:
determine a transmission resource corresponding to a codebook window of the each type according to a last transmission opportunity of the type in the codebook window of the each type; or
determine a transmission resource for the each type according to an uplink control resource configuration of the each type.

13. A method for uplink control information (UCI) transmission, performed by a network device, the method comprising:
sending uplink transmission related information for at least two types of UCIs of at least two types to be transmitted, wherein each type in the at least two types is independently configured with uplink transmission related information;
determining that there is overlap in time domain between at least two types of UCIs of the at least two types to be transmitted; and
receiving UCI of the each type in the at least two types according to the configured uplink transmission related information,
wherein the UCI comprises feedback information of downlink data, and the configured uplink transmission related information comprises at least one of a feedback mode or a feedback timing sequence parameter K1.

14. The method of claim 13, wherein the UCI further comprises at least one of the following information:
channel state information; or
a scheduling request for uplink data.

15. The method of claim 13, wherein the uplink transmission related information further comprises:
PUCCH resource.

16. A device for uplink control information (UCI) transmission, comprising:
a processor; and
a memory configured to store instructions executable by the processor,
wherein the processor executes the instructions to cause the device to:
send uplink transmission related information for at least two types of UCIs of at least two types to be transmitted, wherein each type in the at least two types is independently configured with uplink transmission related information;
determine that there is overlap in time domain between the at least two types of UCIs of the at least two types to be transmitted; and
receive UCI of the each type in the at least two types according to the configured uplink transmission related information,
wherein the UCI comprises feedback information of downlink data, and the configured uplink transmission related information comprises at least one of a feedback mode or a feedback timing sequence parameter K1.

17. The device of claim 16, wherein the UCI further comprises at least one of the following information:
channel state information; or
a scheduling request for uplink data.

18. The device of claim 16, wherein the uplink transmission related information further comprises:
PUCCH resource.

19. The method of claim 6, wherein a service priority of the first type is greater than a service priority of the second type.

20. The method of claim 13, wherein the feedback mode is a feedback manner in a codebook window of each type, and the feedback timing sequence parameter K1 is configured to determine a transmission opportunity in the codebook window of each type.

* * * * *